United States Patent [19]

Carre

[11] 4,109,764
[45] Aug. 29, 1978

[54] FLOATING CALIPER DISC BRAKE AND A GUIDE KEY FOR THE SAME

[75] Inventor: Jean-Jacques Carre, Montreuil, France

[73] Assignee: Societe Anonyme D.B.A., Paris, France

[21] Appl. No.: 767,581

[22] Filed: Feb. 10, 1977

[30] Foreign Application Priority Data

Mar. 12, 1976 [FR] France .................. 76 07118

[51] Int. Cl.² ......................................... F16D 55/224
[52] U.S. Cl. .................................. 188/72.4; 188/73.3
[58] Field of Search ............ 188/72.4, 73.3, 73.5, 188/71.1, 106 F

[56] References Cited

U.S. PATENT DOCUMENTS

| | | | |
|---|---|---|---|
| 3,166,157 | 1/1965 | Burnett | 188/71.1 |
| 3,403,756 | 10/1968 | Thirion | 188/73.3 |
| 3,430,737 | 3/1969 | Welsh | 188/73.3 |
| 3,625,315 | 12/1971 | Laverdant | 188/106 F |

FOREIGN PATENT DOCUMENTS 2,252,240  5/1974  Fed. Rep. of Germany ......... 188/73.3

*Primary Examiner*—Edward R. Kazenske
*Attorney, Agent, or Firm*—Paul David Schoenle; Ken C. Decker

[57] ABSTRACT

A disc brake of the type comprising a caliper or frame member slidably and floatingly mounted on a fixed member by way of two guide keys is disclosed. According to the invention, the guide keys slidably cooperate with one of the members by way of guide surfaces and floatingly cooperate with the other member by way of a cylindrical surface cooperating with a substantially plane surface. Preferably, the lines of contact defined between the cylindrical surfaces and the plane surfaces are comprised in a plane substantially parallel to the disc faces and which lies between the faces or offset relative to the latter towards an actuator.

1 Claim, 5 Drawing Figures

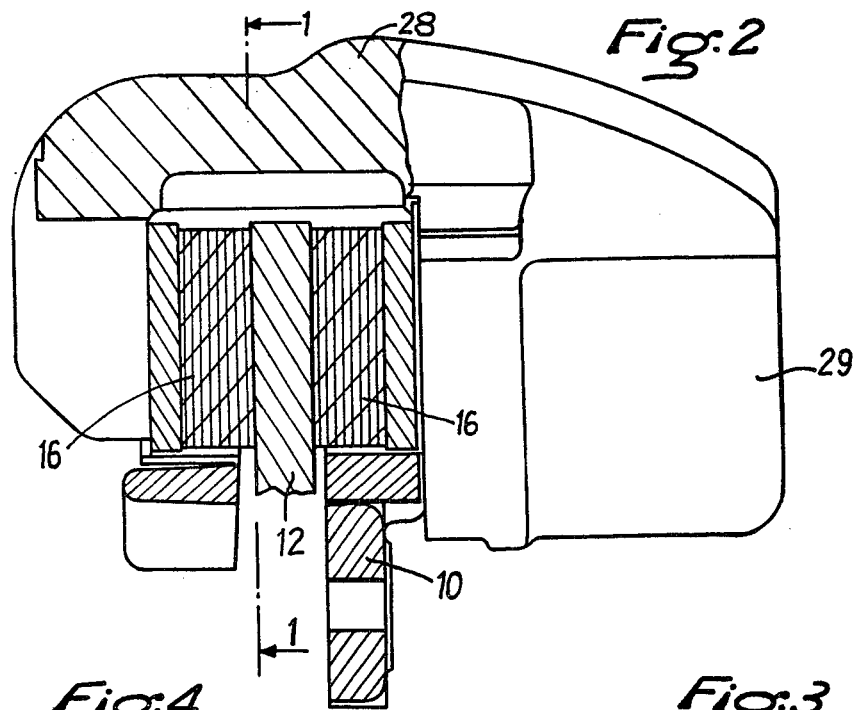
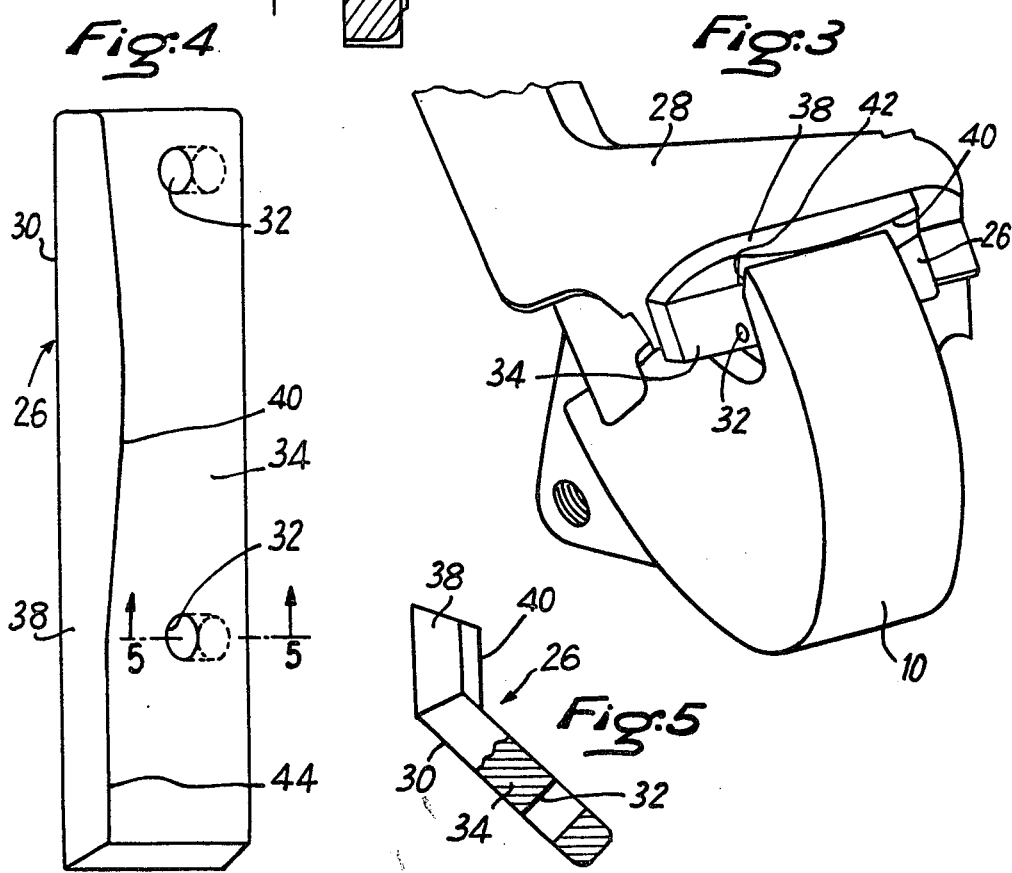

FLOATING CALIPER DISC BRAKE AND A GUIDE KEY FOR THE SAME

BACKGROUND OF THE INVENTION

The invention relates to a disc brake and more particularly to a disc brake of the type comprising a caliper or frame member straddling a rotary disc and slidable on a fixed member by means of two circumferentially spaced guide keys, actuating means being associated with the caliper or frame member so as to urge directly a first friction pad and, by reaction, a second friction pad on to the respective faces of the disc, each of the keys being associated with one of the said members and comprising a guiding surface which slidably cooperates with a corresponding surface of the other member, means being provided to permit pivoting of the caliper or frame member in a plane perpendicular to the disc and passing through the circumferentially spaced guide keys.

The invention also relates to a guide key for use in a brake of this type.

Brakes of the type defined are generally called floating caliper or floating-frame brakes.

In this type of brake, the caliper can pivot slightly in a plane perpendicular to the disc, so that it compensates automatically for slight warping of the disc or for any lack of parallelism between the axis of the disc and the direction of caliper sliding as defined by the guide surfaces of the keys.

The means permitting pivoting of the caliper forming member are usually provided at the sliding surfaces, which are reduced to lines of contact. With such an arrangement, however, impurities can easily slip between the sliding surfaces, so that after prolonged use of the brake the caliper forming member may be unable to slide relative to the fixed support member.

SUMMARY OF THE INVENTION

In order to overcome this disadvantage while retaining the advantages of floating-caliper or floating-frame brakes, the invention proposes a brake of the type defined in which the pivoting means are provided between each of the keys and the said one member.

According to another aspect of the invention, each of the keys cooperates the said one member along a line of contact substantially perpendicular to the said plane.

The invention relates also to a guide key for a disc brake embodying the invention, the key having a substantially V-shaped cross-section, a cylindrical surface being formed on the interior of one arm of the V to define said line of contact.

The invention will now be described by way of example with reference to the accompanying drawings, in which:

FIG. 2 is a section view along a line 2—2 in FIG. 1;

FIG. 3 is a perspective view of part of the brake shown in FIGS. 1 and 2, illustrating the sliding connection provided between the caliper and the fixed support;

FIG. 4 is a plan view of a key for the disc brake shown in FIGS. 1 to 3; and

FIG. 5 is an end view, half in section along a line 5—5 in FIG. 4, of the key shown in FIG. 4.

Figure 1:
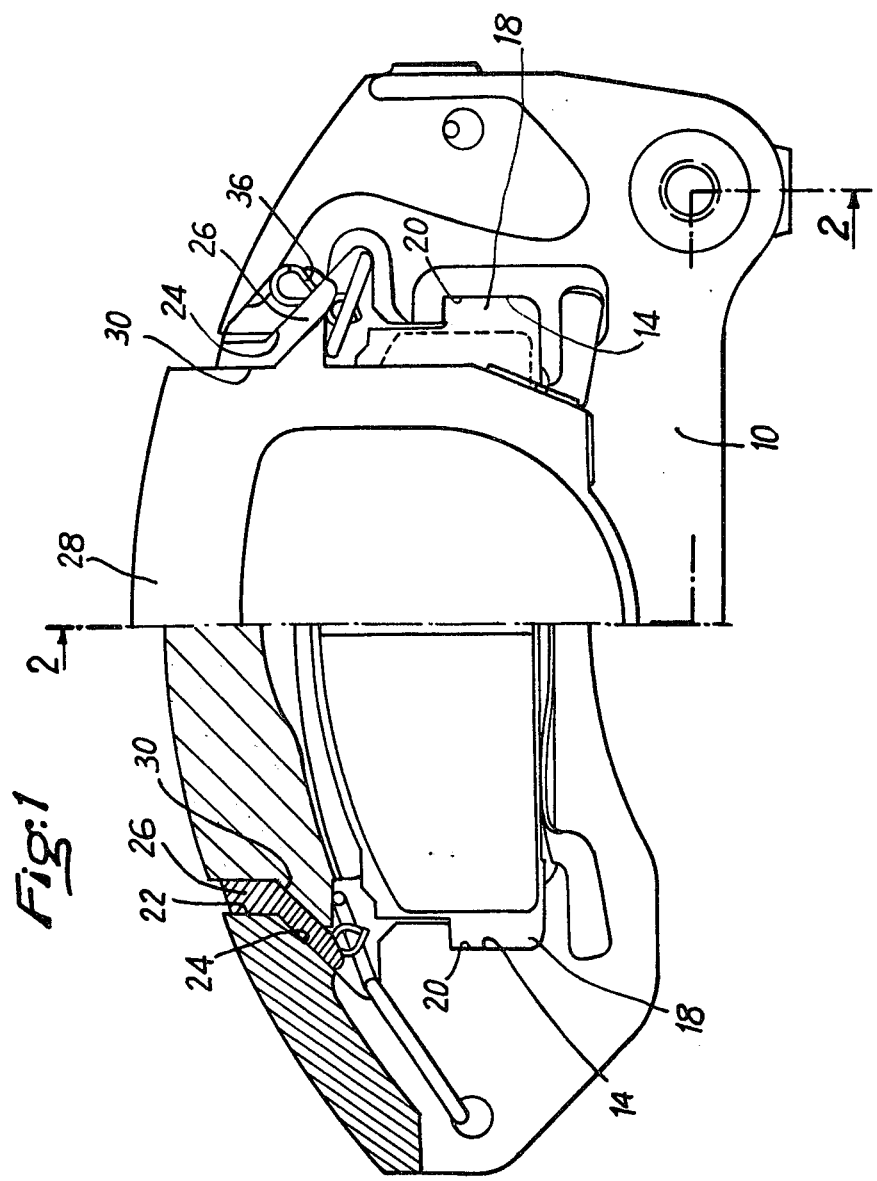
FIG. 1 is an elevation view half in section along a line 1—1 in FIG. 2, of a disc brake embodying the principles of the invention.

The disc brake shown in FIGS. 1 and 2 comprises a U-shaped fixed member 10 of which two arms extend on either side of a disc 12, substantially parallel to the faces of the disc. Each arm of the fixed member 10 defines a window 14 which receives a friction pad 16. Each of the pads 16 has a backing plate to which a friction lining is attached by any known means, for example adhesive or rivets. The backing plate of each pad 16 bears on each of its circumferential ends, a lug 18 slidable in a recess 20 in the associated window 14.

The fixed member 10 also contains a radial aperture 22, of which the circumferentially spaced edges 24 slidably receive a caliper member 28 by way of keys 26. Actuating means 29 associated with the caliper member 28 urge one pad 16 directly and the other pad 16 by reaction on to the respective faces of the disc 12. The actuating means 29 may be of any conventional type, for example, a piston mounted in a cylinder and operated by hydraulic fluid pressure from the master cylinder of the vehicle (not shown).

In cross-section, each key 26 substantially forms a V of which the outside surfaces form the guide surfaces 30 for the caliper member 28. Holes 32 are provided near the ends of the key 26 in one of its portions 34, to receive pins 36 or the like which hold the keys 26 in position relative to the fixed member 10. The second portion 38 of each key 26 has on its inner side a cylindrical surface of revolution 40 which cooperates with a substantially plane surface 42 of the fixed member 10. The surfaces 40, 42 therefore define means for pivoting the caliper member 28 in a plane which runs perpendicular to the disc 12 and passes through the circumferentially spaced edges 24 of the aperture 22. Thus the keys 26 cooperate with the fixed support 10 along a straight line of contact substantially perpendicular to this plane and defined by a generatrix of the cylindrical surface 40 in contact with the substantially plane surface 42. This arrangement permits slight pivoting of the caliper member 28 relative to the fixed member 10, without however encouraging impurities to penetrate between the guide surface 30 of each key 26 and the caliper member 28.

The cylindrical surface 40 on the inner edge of the second portion 38 of each key 26 is extended on that side of the caliper member 28 remote from the actuating means 29 by a substantially plane surface 44.

Preferably, the generatrices of contact between the cylindrical surfaces 40 and the plane surfaces 42 are situated in a plane parallel to the plane defined by the faces of the disc 12. The plane may lie between the two faces of the disc, so that the caliper member pivots fairly symmetrically relative to the disc. Alternatively, it may be offset towards the actuating means 29 relative to the disc, so that the caliper member can balance satisfactorily relative to the fixed member.

The invention is not restricted to the brake described by way of example, but may be applied to all brakes in which a caliper or a frame member can slide and float on a fixed member by way of two keys.

Also, the means for pivoting the caliper need not be the pivoting means described, but may be applied to any comparable design in which the pivoting means are situated between the keys and the member with which they are associated, whether this member is the caliper or frame member or the fixed member.

What I claim is:

1. In a disc brake having a caliper straddling a rotary disc and sliding relative to a fixed member by means of two circumferentially spaced guide keys and an actuating means cooperating with the caliper to urge directly a first friction pad and, by reaction, a second friction pad into engagement with the rotary disc, the improvement in which said keys include guiding surfaces slidably engaging said caliper, said keys also including means facing and cooperating with said fixed member to provide for pivoting of said caliper and said keys together relative to said fixed member in a plane perpendicular to said rotary disc, and said means comprising cylindrical surfaces which engage said fixed member at a location substantially in alignment with said rotary disc.

* * * * *